(12) United States Patent
Parker et al.

(10) Patent No.: US 10,714,828 B2
(45) Date of Patent: Jul. 14, 2020

(54) MICROWAVE ANALOG CANCELLATION FOR IN-APERTURE SIMULTANEOUS TRANSMIT AND RECEIVE

(71) Applicant: RAYTHEON COMPANY, Waltham, MA (US)

(72) Inventors: Samuel E. Parker, Lakewood, CA (US); John P. Gianvittorio, Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 445 days.

(21) Appl. No.: 15/444,175

(22) Filed: Feb. 27, 2017

(65) Prior Publication Data

US 2018/0248261 A1    Aug. 30, 2018

(51) Int. Cl.
*H01Q 3/00* (2006.01)
*H01Q 3/26* (2006.01)
*H01Q 3/38* (2006.01)
H04B 1/525 (2015.01)
H04B 1/56 (2006.01)

(52) U.S. Cl.
CPC ............... *H01Q 3/267* (2013.01); *H01Q 3/38* (2013.01); *H04B 1/525* (2013.01); *H04B 1/56* (2013.01)

(58) Field of Classification Search
CPC .......... H01Q 3/267; H01Q 3/38; H04B 1/525; H04B 1/56
USPC ........................................ 342/371, 372, 203
See application file for complete search history.

(56) References Cited

U.S. PATENT DOCUMENTS

| 4,783,660 A | 11/1988 | Pierce |
| 4,968,967 A | 11/1990 | Stove |
| 5,691,978 A | 11/1997 | Kenworthy |
| 6,812,824 B1 * | 11/2004 | Goldinger ............... G06K 17/00 340/10.1 |
| 7,202,812 B2 * | 4/2007 | Krikorian ............... G01S 7/038 342/159 |
| 7,969,350 B2 | 6/2011 | Winstead et al. |
| 8,050,201 B2 * | 11/2011 | Kahrizi .................. H04B 1/525 370/278 |

(Continued)

FOREIGN PATENT DOCUMENTS

| WO | WO-2015/021481 A2 * | 2/2015 |
| WO | WO 2015/021481 A2 | 2/2015 |

(Continued)

OTHER PUBLICATIONS

U.S. Appl. No. 15/295,084, filed Oct. 17, 2016.

(Continued)

*Primary Examiner* — Chuong P Nguyen
(74) *Attorney, Agent, or Firm* — Lewis Roca Rothgerber Christie LLP

(57) ABSTRACT

A system for transmitting and receiving electromagnetic waves simultaneously. A portion of a signal to be transmitted through a transmitting antenna element is diverted from a transmit signal path, processed by an adjustable filter, and coupled into receive signal path. The adjustable filter is adjusted to approximate the channel that the leakage signals go through to get from the transmitter to the receiver so that the signal coupled into the receiving path through the filter partially cancels the parasitic leakage from the transmit signal path to the receive signal path.

12 Claims, 7 Drawing Sheets

(56) References Cited

U.S. PATENT DOCUMENTS

| | | | |
|---|---|---|---|
| 9,327,043 B2 | 5/2016 | Olchovy et al. | |
| 9,479,214 B2 | 10/2016 | Webb et al. | |
| 9,537,543 B2 * | 1/2017 | Choi | H04B 3/23 |
| 10,193,683 B2 * | 1/2019 | Chen | H04B 1/44 |
| 10,200,075 B2 * | 2/2019 | Gianvittorio | H04B 1/44 |
| 10,243,719 B2 * | 3/2019 | Bharadia | H04B 1/525 |
| 2006/0234691 A1 | 10/2006 | Dygert | |
| 2006/0273952 A1 | 12/2006 | Krikorian et al. | |
| 2009/0279893 A1 * | 11/2009 | Tran | H03H 15/00 398/79 |
| 2010/0272005 A1 | 10/2010 | Larsson et al. | |
| 2011/0096667 A1 | 4/2011 | Arita et al. | |
| 2014/0169236 A1 | 6/2014 | Choi et al. | |
| 2014/0348018 A1 | 11/2014 | Bharadia et al. | |
| 2015/0078226 A1 | 3/2015 | Charlon et al. | |
| 2015/0146589 A1 | 5/2015 | Webb et al. | |
| 2016/0344574 A1 * | 11/2016 | Choi | H04B 3/232 |
| 2017/0317759 A1 | 11/2017 | Agazzi et al. | |
| 2018/0106884 A1 * | 4/2018 | Marr | G01S 7/352 |
| 2018/0205533 A1 * | 7/2018 | Lee | H04B 15/02 |

FOREIGN PATENT DOCUMENTS

| | | | |
|---|---|---|---|
| WO | WO-2015/130257 A1 * | 9/2015 | |
| WO | WO 2015/130257 A1 | 9/2015 | |

OTHER PUBLICATIONS

Marr, et al., U.S. Appl. No. 15/295,084, entitled "System and Method for Adaptive Simultaneous Transmit and Receive Cancellation" filed Oct. 17, 2016 (23 pages).

Ogue, Juan Carlos et al.; "A Fast Convergence Frequency Domain Adaptive Filter"; IEEE Transactions on Acoustics, Speech, and Signal Processing; vol. ASSP-31; No. 5; Oct. 1983; pp. 1312-1314.

International Search Report for corresponding International Application No. PCT/US2017/067853, filed Dec. 21, 2017, International Search Report dated Apr. 5, 2017 and dated Apr. 12, 2018 (5 pgs.).

Written Opinion of the International Searching Authority for corresponding International Application No. PCT/US2017/067853, filed Dec. 21, 2017, Written Opinion of the International Searching Authority dated Apr. 12, 2018 (6 pgs.).

Shynk, "Frequency-Domain and Multirate Adaptive Filtering", IEEE Signal Processing Magazine, vol. 9, No. 1 Jan. 1992 (pp. 14-37).

International Search Report for related International Application No. PCT/US2017/044490, filed Jul. 28, 2017, International Search Report dated Oct. 25, 2017 and dated Nov. 7, 2017 (5 pgs.).

Written Opinion of the International Searching Authority for related International Application No. PCT/US2017/044490, filed Jul. 28, 2017, Written Opinion of the International Searching Authority dated Nov. 7, 2017 (9 pgs.).

* cited by examiner

MICROWAVE ANALOG CANCELLATION FOR IN-APERTURE SIMULTANEOUS TRANSMIT AND RECEIVE

CROSS-REFERENCE TO RELATED APPLICATION(S)

This application is related to and incorporates by reference in its entirety, as if set forth in full, U.S. patent application Ser. No. 15/295,084, entitled "SYSTEM AND METHOD FOR ADAPTIVE SIMULTANEOUS TRANSMIT AND RECEIVE LEAKAGE CANCELLATION", filed on Oct. 17, 2016, issued Aug. 27, 2019 as U.S. Pat. No. 10,393,859.

BACKGROUND

1. Field

One or more aspects of embodiments according to the present invention relate to a system for transmitting and receiving electromagnetic waves, and more particularly to a system and method for transmitting and receiving simultaneously.

2. Description of Related Art

In various commercial or military systems that transmit and receive electromagnetic waves, such as communications systems or radar systems, it may be useful to transmit and receive simultaneously. Coupling of the transmitted signal, which may be strong, into the receiver, which may otherwise receive only a relatively weak signal, may however interfere with simultaneous receiver operation and pose an obstacle to this mode of operation.

Thus, there is a need for a system and method for simultaneously transmitting and receiving electromagnetic waves.

SUMMARY

Aspects of embodiments of the present disclosure are directed toward a system for transmitting and receiving electromagnetic waves simultaneously. A portion of a signal to be transmitted through a transmitting antenna element is diverted from a transmit signal path, processed by an adjustable filter, and coupled into a receive signal path. The adjustable filter is adjusted to approximate the channel that the leakage signals go through to get from the transmitter to the receiver so that the signal coupled into the receiving path through the filter partially cancels the parasitic leakage from the transmit signal path to the receive signal path.

According to an embodiment of the present invention there is provided a transmit-receive phased array system for simultaneously transmitting and receiving, including: a transmit input for receiving a signal to be transmitted; a transmit output, operatively coupled to the transmit input, for producing a signal for an antenna element; a receive input, for receiving a signal from the antenna element; a receive output, for producing an analog corrected receive signal, the receive output operatively coupled to the receive input through a receive signal path, an adjustable filter having: an input operatively coupled to the transmit input and an output operatively coupled to the receive signal path; a digitizer operatively coupled to, and configured to digitize signals from: the receive output, the input of the filter; the output of the filter; and the receive signal path, to form corresponding digitized signals, and a processing circuit, configured to: control the adjustable filter so as to partially cancel parasitic leakage from the transmit input to the receive output; estimate an added noise and distortion component of the digitized receive output signal to form a digital noise and distortion correction signal, the noise and distortion component being due to effects from the adjustable filter; and subtract the digital noise and distortion correction signal from the digitized receive output signal.

In one embodiment, the processing circuit is further configured to: digitally filter the digitized signal from the output of the adjustable filter to form a digital parasitic leakage correction signal; and subtract the digital parasitic leakage correction signal from the digital receive output signal.

In one embodiment, the adjustable filter is an analog finite impulse response filter.

In one embodiment, the analog finite impulse response filter is implemented as a tapped delay line.

In one embodiment, the tapped delay line includes: a plurality of power dividers, each having: an input; a first output; and a second output; a plurality of delay elements, each connected to a respective power divider of the plurality of power dividers; and a plurality of multipliers for respective tap weights, each connected to a respective power divider of the plurality of power dividers; a second delay element of the plurality of delay elements providing a delay twice as great as a delay provided by a first delay element of the plurality of delay elements, and the second delay element providing a delay twice as great as a delay provided by a third delay element of the plurality of delay elements.

In one embodiment, the input of a second power divider of the plurality of power dividers is connected to the first output of a first power divider of the plurality of power dividers through a first attenuator, the first output of the second power divider is connected to a multiplier for a first tap weight, of the plurality of multipliers for respective tap weights, through a second attenuator, and the first output of a third power divider is connected to a multiplier for a second tap weight, of the plurality of multipliers for respective tap weights, through a third attenuator.

In one embodiment, each of: the multiplier for the first tap weight; and the multiplier for the second tap weight; is a vector modulator configured to receive two analog voltages representing the respective tap weight.

In one embodiment, the system includes a digital to analog converter connected to the processing circuit and to an analog input of each of the vector modulators.

In one embodiment, the system includes: a first directional coupler having: an input port connected to the transmit input, a coupled port, and a through port, and a second directional coupler having: an input port connected to the coupled port of the first directional coupler, a coupled port, and a through port, wherein the input of the adjustable filter is connected to the through port of the second directional coupler, and the input of the adjustable filter is operatively coupled to the transmit input through the first directional coupler and through the second directional coupler.

In one embodiment, the system includes a third directional coupler having: an input port connected to the output of the filter, a coupled port, and a through port, the coupled port being connected to the digitizer, and configured to provide, to the digitizer, the signal from the output of the filter.

In one embodiment, the adjustable filter includes a plurality of control inputs for setting a corresponding plurality of adjustable parameters, and the processing circuit is configured to calculate a plurality of parameter values and provide a plurality of corresponding signals to the control inputs.

In one embodiment, the processing circuit is configured to calculate the plurality of parameter values using a least mean squares method.

In one embodiment, the processing circuit is configured to calculate the plurality of parameter values using a recursive least squares filter.

According to an embodiment of the present invention there is provided a transmit-receive array, including a plurality of transmit-receive modules, each of the transmit-receive modules including: a transmit input for receiving a signal to be transmitted; a transmit output, operatively coupled to the transmit input, for producing a signal for an antenna element; a receive input, for receiving a signal from the antenna element; a receive output, for producing an analog corrected receive signal, the receive output operatively coupled to the receive input through a receive signal path, an adjustable analog filter having: an input operatively coupled to the transmit input and an output operatively coupled to the receive signal path; a digitizer operatively coupled to, and configured to digitize signals from: the receive output, the input of the filter; the output of the filter; and the receive signal path, to form corresponding digitized signals, and a processing circuit, configured to: control the adjustable filter so as to partially cancel parasitic leakage from the transmit input to the receive output; estimate an added noise and distortion component of the digitized receive output signal to form a digital noise and distortion correction signal, the noise and distortion component being due to effects from the adjustable filter; and subtract the digital noise and distortion correction signal from the digitized receive output signal.

In one embodiment, the processing circuit of each of the transmit-receive modules is further configured to: digitally filter the digitized signal from the output of the adjustable filter of the transmit-receive module to form a digital parasitic leakage correction signal; and subtract the digital parasitic leakage correction signal from the digital receive output signal of the transmit-receive module.

In one embodiment, the adjustable filter of each of the transmit-receive modules is an analog finite impulse response filter.

In one embodiment, the analog finite impulse response filter of each of the transmit-receive modules is a tapped delay line.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for microwave analog cancellation for in-aperture simultaneous transmit and receive for phased array RF systems provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
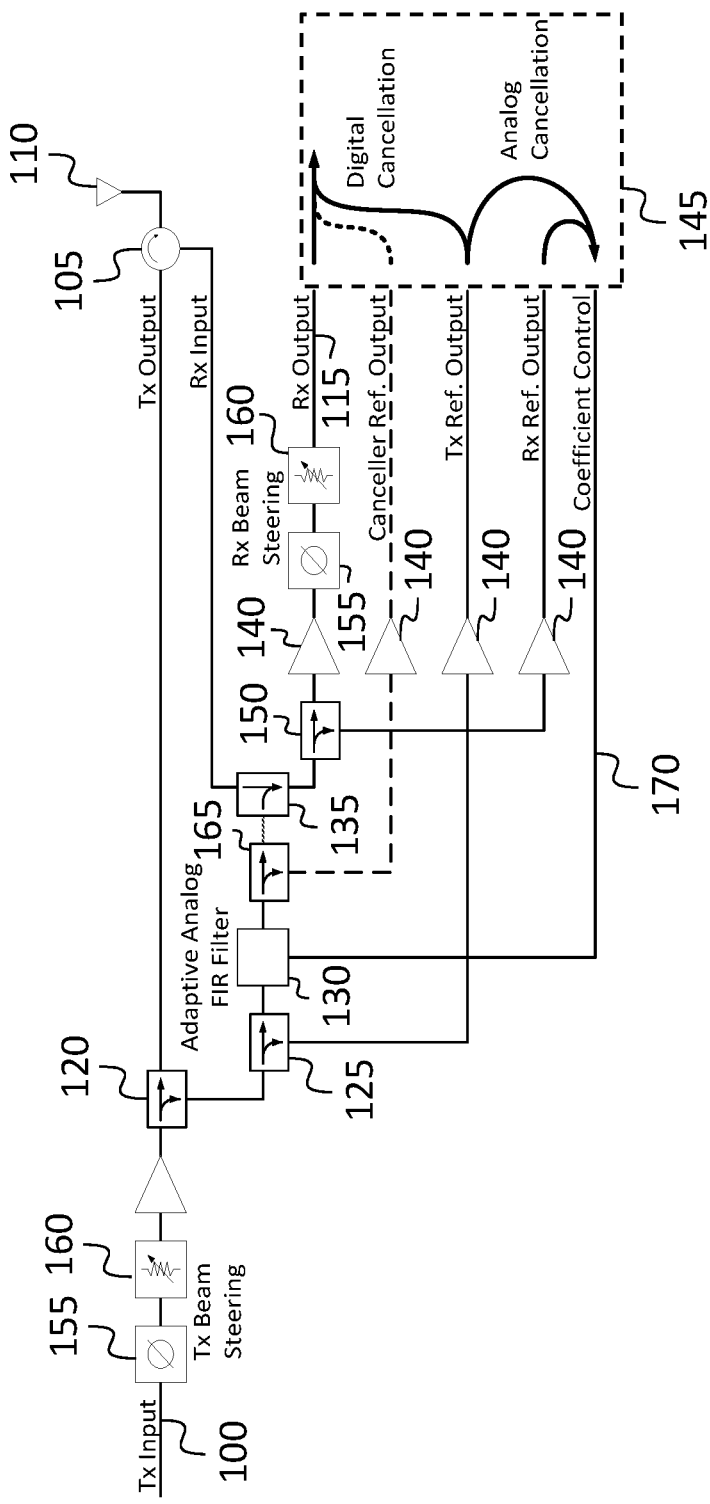
FIG. 1 is a block diagram of a transmit-receive system, according to an embodiment of the present invention.

Referring to FIG. 1, in some embodiments, a transmit-receive system includes a transmit input 100, connected through a circulator 105 to an antenna element 110. The antenna element 110 may transmit and receive simultaneously. A received signal may travel from the antenna element 110 through the circulator 105 and along a receive signal path to a receive output 115.

Power may leak from the transmit input 100 to the receive output 115 through various mechanisms, such as by reflection from the antenna element or through imperfect isolation of the circulator. Such leakage, referred to herein as "parasitic" leakage (and which results in a signal, in the receive signal path, referred to herein as a "parasitic" signal), may degrade the performance of the receiver, for example by adding noise to the received signal, or causing distortion of the received signal through nonlinear mechanisms.

Accordingly, a portion of the transmitted signal may be diverted (e.g., by a first directional coupler 120), transmitted through a second directional coupler 125, and filtered (e.g., by an adjustable filter 130) to form a correction signal, and the correction signal may be coupled to the receive signal path, e.g., through a third directional coupler 135. Each such directional coupler may have an input port, a coupled port (to which a relatively small fraction of the input power is diverted) and a transmitted or "through" port (to which most of the input power is transmitted). The correction signal coupled into the receive signal path may be adjusted (e.g., in the adjustable filter 130) to be substantially equal in amplitude and time to the parasitic signal and substantially opposite in phase across some bandwidth of interest, so that it partially (or substantially) cancels the parasitic leakage across some bandwidth of interest. As used herein, the term "partially" when used to refer to a degree of cancellation or subtraction includes any degree of cancellation or subtraction, including perfect cancellation or perfect subtraction.

A further portion of the transmitted signal may be diverted, by the second directional coupler 125 (from the portion of the transmitted signal diverted by the first directional coupler 120), amplified by an amplifier 140 to form a transmit reference signal, and fed into a control and correction circuit 145. Other signals fed to the control and correction circuit 145 (discussed in further detail below) may also be amplified by similar amplifiers 140. Similarly, a portion of the received signal may be diverted from the receive signal path by a fourth directional coupler 150, and similarly amplified to form a receive reference signal and fed into the control and correction circuit 145. The control and correction circuit 145 may infer, e.g., by correlating the receive reference signal and the transmit reference signal, the extent to which un-canceled or "residual" parasitic signal remains in the receive reference signal, and it may adjust the adjustable filter 130 (through a coefficient control connection 170) to endeavor to further reduce the residual parasitic signal. This adjustment or "adaptation" of the adjustable filter 130 may be performed continuously and in real time by the control and correction circuit 145 during operation.

The adjustable filter 130 may have a plurality of adjustable parameters (e.g., "tap weights", and "tap spacing", discussed in further detail below) that determine the amplitude, time, and phase changes imparted by the adjustable filter 130 to the signal propagating through it. To determine the direction in which to adjust the adjustable parameters of the adjustable filter 130, and the extent to which to adjust them, the control and correction circuit 145 may employ a canonical calculation or utilize adaptive algorithms, such as a least mean squares (LMS) algorithm or a recursive least squares (RLS) algorithm. In this manner the system may continually adapt the adjustable parameters of the adjustable filter 130, in real time.

The through port of the fourth directional coupler 150 may be amplified by an amplifier 140 and its amplitude and phase may be further adjusted by a beam steering circuit (which may include an adjustable phase shifter 155 and an adjustable attenuator 160) to form the signal at the receive output 115 which may be fed into the control and correction circuit 145 or into the receiver of the RF system. In the signal at the receive output 115, the effects of parasitic leakage may be largely suppressed by the analog cancellation provided through the cancellation path including the first directional coupler 120, the adjustable filter 130, and the third directional coupler 135. The signal at the receive output 115 may be digitized, and further cancellation may be performed digitally by the control and correction circuit 145, which may correlate the transmit reference signal with the signal at the receive output 115, and then subtract a digital parasitic leakage correction signal (which may be a digitally filtered version of the digitized transmit reference signal) from the digitized signal at the receive output 115. The parameters of the digital filter used to filter the digitized transmit reference signal may similarly be computed directly or adjusted adaptively, e.g., using a least mean squares (LMS) algorithm, or "least mean squares method" or a recursive least squares (RLS) algorithm.

The transmit-receive system of FIG. 1 may be part of an array of like systems, (the antenna elements of which form, for example, an array antenna). The transmitted signals may originate from a common source, and the relative amplitude and phase of the signal transmitted by each element may be controlled by a beam steering circuit (which, like the receive beam steering circuit, may include an adjustable phase shifter 155 and an adjustable attenuator 160). The adaptation of the adjustable parameters of the adjustable filter 130, and of the digital filter, may also serve to cancel parasitic cross-coupling between elements of the array, e.g., coupling of a parasitic signal from the transmit input of a first transmit-receive system of the array into the receive signal path of a second transmit-receive system of the array, because this cross-coupled parasitic signal will also be correlated with the transmit reference signal in the second transmit-receive system, and accordingly, the control and correction circuit 145 of the second transmit-receive system will endeavor to cancel it. In such a system, when the transmitter beam steering circuit is adjusted, the adaptive algorithms of the control and correction circuit 145 may automatically account for the change in amplitude or phase and dispersion of cross-coupled parasitic signals that results by adjusting the adjustable parameters of the adjustable filter 130, and of the digital filter, accordingly.

The adjustable filter 130 may include active elements, e.g., amplifiers, or multipliers, and, in addition to imparting time, amplitude, and phase changes to the signal propagating through it, the adjustable filter 130 may add unwanted noise or distortion in or out of the bandwidth of the desired cancellation (referred to herein as "filter noise") to the signal, which may degrade the performance of the receiver. Accordingly, the control and correction circuit 145 may estimate the additive noise and distortion added from the analog canceller filter 130 to adjust the analog cancellation coefficients 170 and the digital cancellation coefficients to perform a noise canceling function. A fifth directional coupler 165 may be used to divert a portion of the signal at the output of the adjustable filter 130, amplified to form a canceler reference output signal, and fed into the control and correction circuit 145. From the canceler reference output signal and the transmit reference signal, the control and correction circuit 145 may form a digital noise correction signal (as an estimate of the filter noise component in the signal at the receive output 115) and subtract this digital noise correction signal from the signal at the receive output 115. The control and correction circuit 145 may also estimate the filter noise and distortion component by, for example, calculating, from the transmit reference signal and the values of the adjustable parameters of the adjustable filter 130, what the signal at the output of the adjustable filter 130 would be if the adjustable filter 130 were free of noise and distortion, and subtracting this hypothetical signal from the signal measured at the output of the adjustable filter 130, to estimate the noise and distortion at the output of the adjustable filter 130. In another embodiment, an adaptive algorithm (such as a least mean squares (LMS) algorithm or a recursive least squares (RLS) algorithm) is used to adjust the signal at the output of the adjustable filter 130 (as measured by the canceler reference output signal) to match the computed ideal signal.

Figure 2:
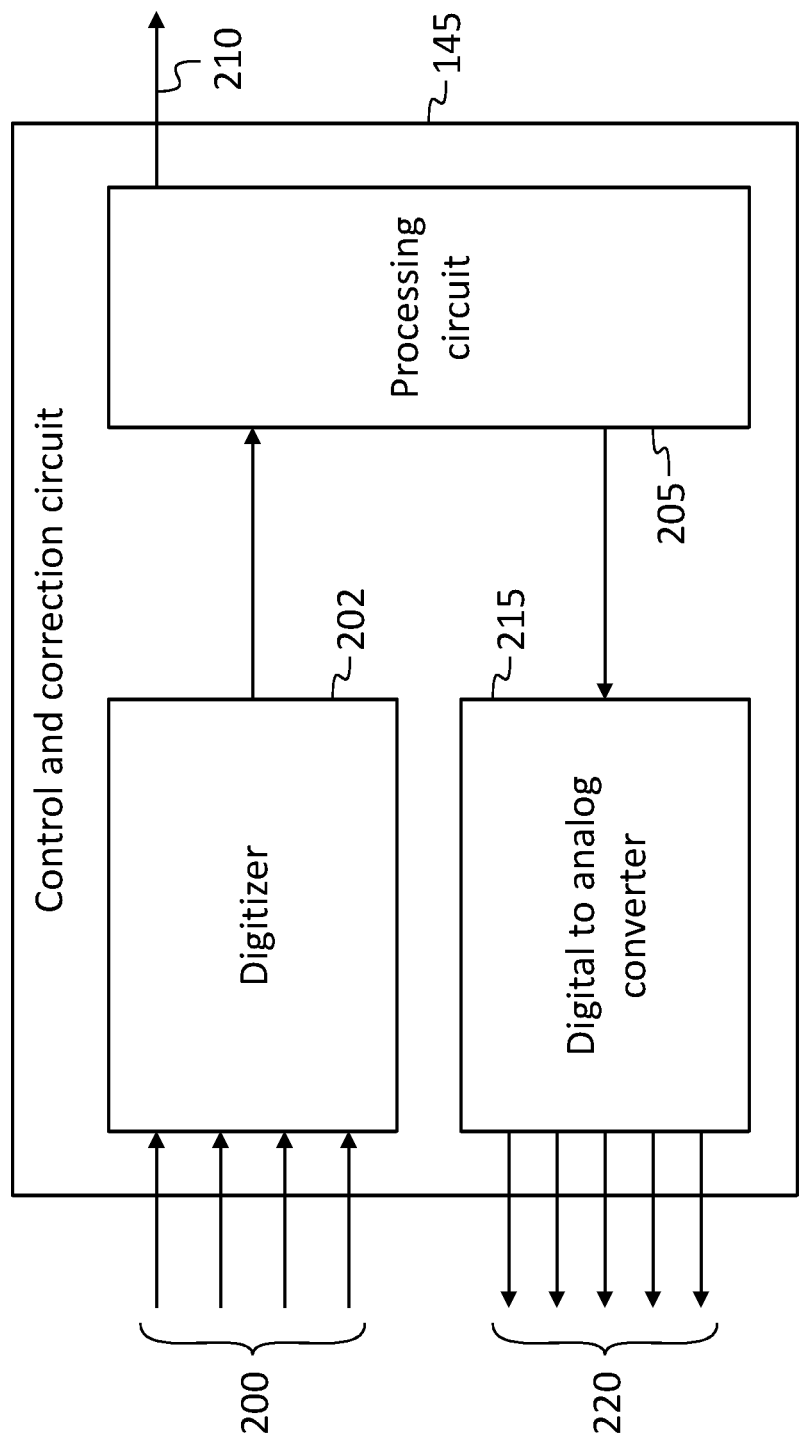
FIG. 2 is a block diagram of a control and correction circuit, according to an embodiment of the present invention.

FIG. 2 shows the internal structure of the control and correction circuit 145, in one embodiment. Input signals 200, such as the receive reference signal and the canceler reference output signal, are digitized by a digitizer 202 (e.g., an analog to digital converter), and the digital signals are processed (e.g., as described above) by a processing circuit 205 (discussed in further detail below). The processing circuit 205 may have a digital received signal output 210 for sending the corrected received signal (in which parasitic leakage is partially canceled and filter noise is partially subtracted) to a subsequent circuit, such as a portion of a communications system, a client of a communications system, or a radar system. A digital to analog converter 215 may convert digital control signals from the processing circuit 205 to analog control signals 220 (i.e., parameter control signals or coefficient control signals) for the adjustable filter 130. In some embodiments the adjustable filter 130 is digitally controlled (e.g., it contains one or more analog to digital converters) and the control outputs for it, from the control and correction circuit 145, are digital outputs. In such an embodiment the digital to analog converter 215 may be absent from the control and correction circuit 145.

Figure 3A:
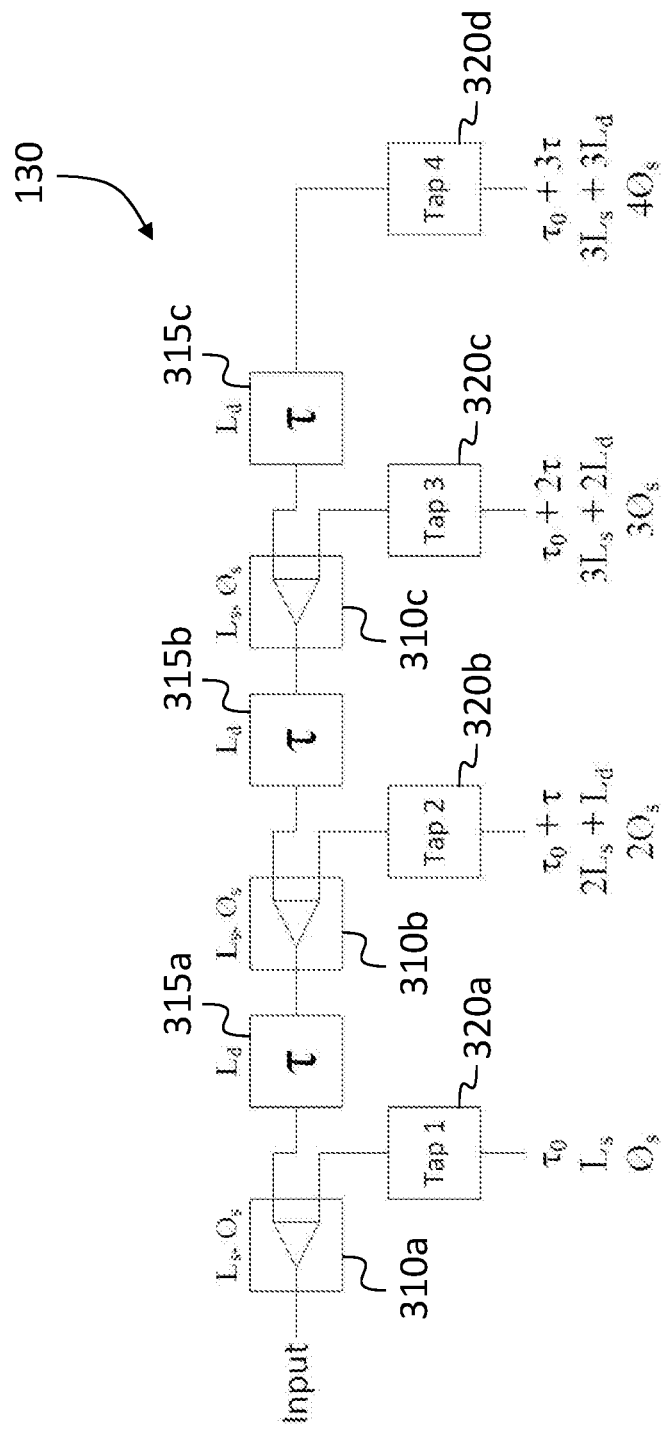
FIG. 3A is a block diagram of a tapped delay line, according to an embodiment of the present invention.

Referring to FIG. 3A, in some embodiments, the adjustable filter 130 is an analog finite impulse response filter implemented as a 4-tap tapped delay line. In this circuit power dividers 310*a-c* alternate with delay elements 315*a-c*. Each power divider 310*a-c* has a tap output that is connected to a multiplier 320a-c for a respective tap weight (i.e., a multiplier multiplying the signal transmitted through it by a respective tap weight). The final delay element 315c also has a tap output that is connected to a multiplier 320d for a respective tap weight. The products of the tap output signals and the respective tap weights (i.e., the outputs of the multipliers 320a-d) may be combined by a combiner (not shown) to form the filter output. The tap weights may be the adjustable parameters, or "coefficients" of the adjustable filter 130.

Figure 3B:
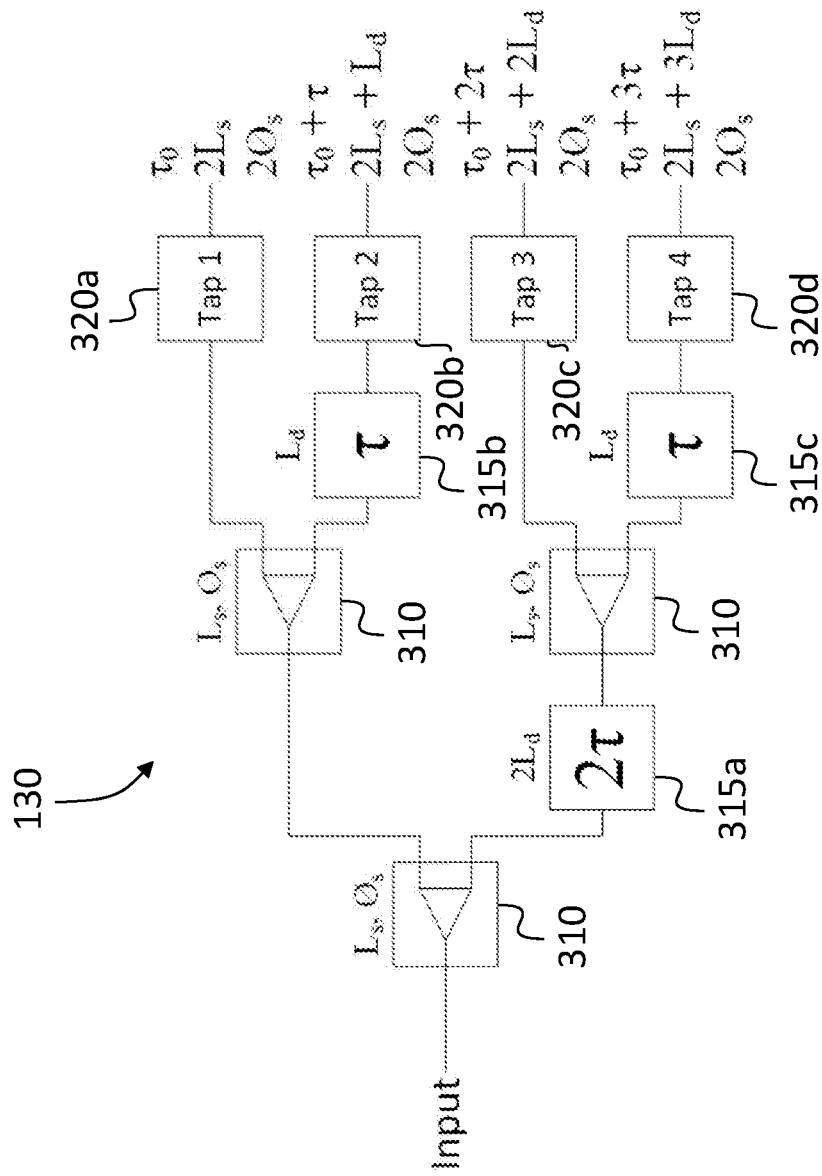
FIG. 3B is a block diagram of a tapped delay line, according to an embodiment of the present invention.

FIG. 3B also shows a 4-tap tapped delay line embodiment of the adjustable filter 130, according to another embodiment in which the delay line has a parallel topology. As in the case of the linear tapped delay line of FIG. 3A, the signal at the output of the second multiplier 320b, for example, propagates through one delay element 315b providing one unit ($\tau$) of delay; the signal at the output of the fourth multiplier 320d propagates through two delay elements 315a and 315c providing, (like the three delay units 315a-c between the input and the output of the fourth multiplier 320d of the linear tapped delay line of FIG. 3A) a total of three units (i.e., $3\tau$) of delay. The configuration of FIG. 3B may exhibit less loss than the configuration of FIG. 3A (with, for example, the splitter loss at the output of the fourth multiplier 320d being 2 $L_s$ in FIG. 3B and 3 $L_s$ in FIG. 3A), the splitter phase contributions may be the same at all taps (being $2\phi_s$ for each tap in the configuration of FIG. 3B, but ranging from $\phi_s$ to $4\phi_s$ in the configuration of FIG. 3A), and the amplitude variation across the taps may be lower in the configuration of FIG. 3B (the total loss being lower, for example, at the output of the fourth multiplier 320d) than in the configuration of FIG. 3A. The configuration of FIG. 3B may also make it possible to insert gain stages within the delay line without affecting the relative phases at the taps (as illustrated for example in FIGS. 4A and 4B, and discussed in further detail below).

Figure 4A:
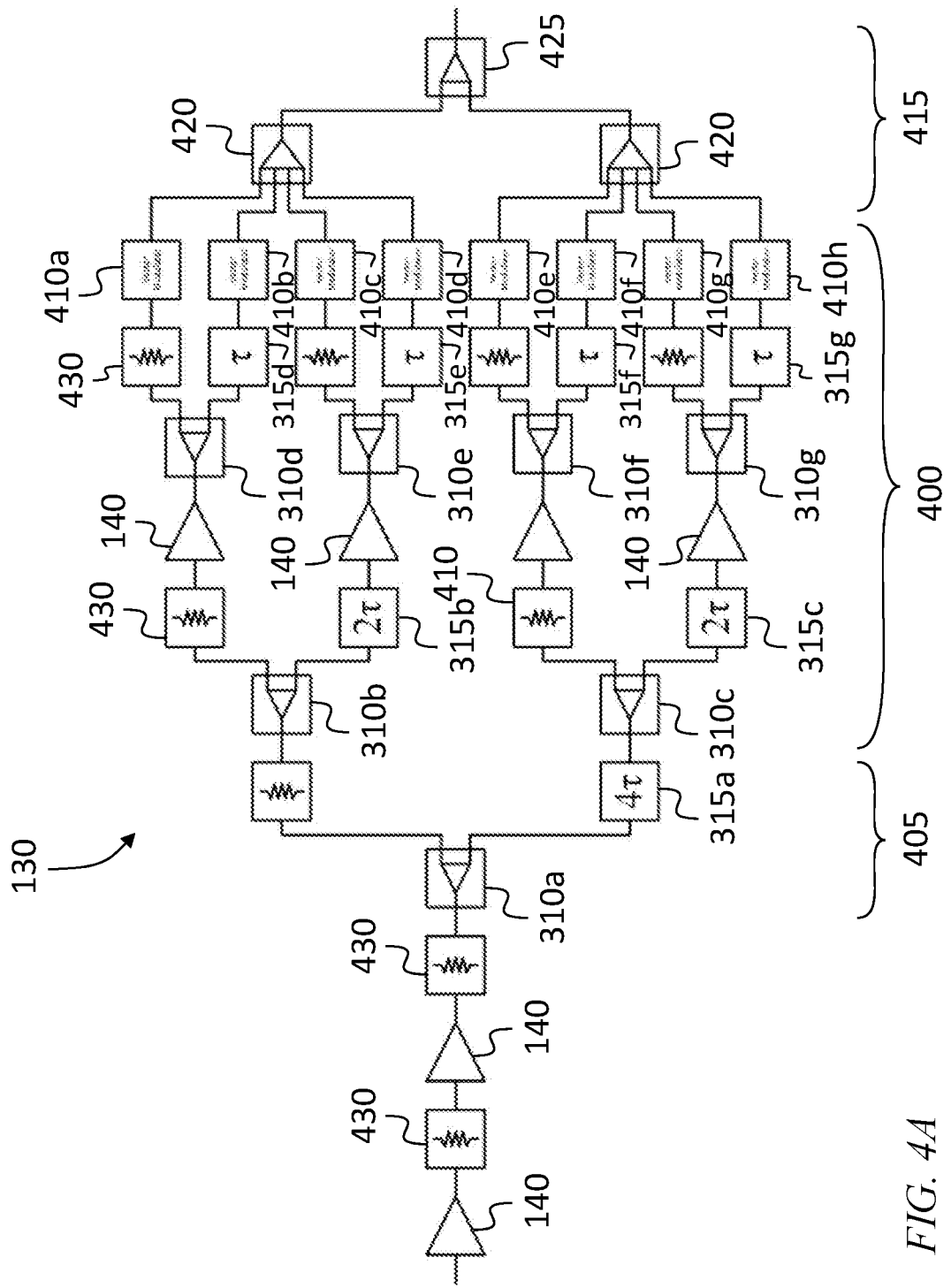
FIG. 4A is a block diagram of a tapped delay line, according to an embodiment of the present invention.

Referring to FIG. 4A, the circuit of FIG. 3B may be generalized to an 8-tap tapped delay line that includes two 4-tap tapped delay lines 400 each similar to the one of FIG. 3B, fed by the two taps of a 2-tap tapped delay line 405 having a delay difference of four units ($4\tau$) of delay between them. Each of the tap weights may be implemented using a respective vector modulator 410a-h; the outputs of the vector modulators may be combined in a combiner 415 (e.g., an 8-way combiner 415 constructed from two four-way combiners 420 and a two-way combiner 425).

Amplifiers 140 may be included at various stages in the tapped delay line to compensate for losses in the other components and avoid an unacceptable loss of signal to noise ratio. An attenuator 430 may be included at each output of each power divider 310a-g at which a delay element 315a-g is not present, to balance the loss of the delay element 315a-g at the other output. For example, an attenuator 430 may be coupled to a first output of power divider 310b and a delay element 315b may be coupled to a second output of power divider 310b. Attenuators 430 may also be used (e.g., at the input) to reduce the gain of an amplifier stage (e.g., if a commercial amplifier with a suitable gain is not readily available) and to improve reverse isolation.

Figure 4B:
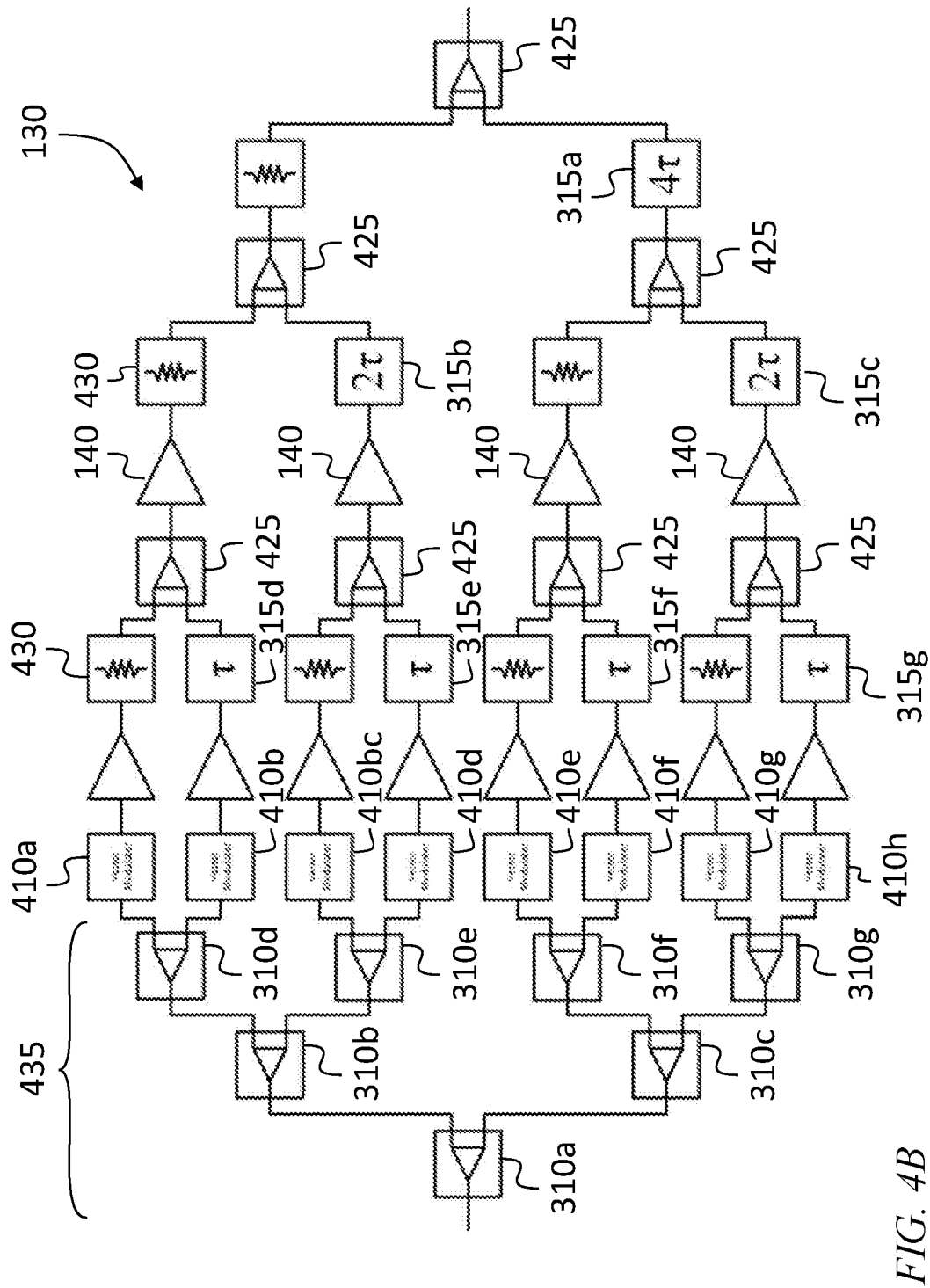
FIG. 4B is a block diagram of a tapped delay line, according to an embodiment of the present invention.

Referring to FIG. 4B, in another embodiment, an 8-tap tapped delay line includes an 8-way power divider 435 feeding a set of 8 taps with tap weights implemented using vector modulators 410a-h, at the input of the parallel delay line. The parallel delay line of FIG. 4B has delay stages that are increasingly coarse in the direction from the input to the output, unlike the parallel delay line of FIG. 4A, which has delay stages that are increasingly fine in the direction from the input to the output. The circuit of FIG. 4A may be better suited for applications in which preserving signal to noise ratio is important, whereas the circuit of FIG. 4B may be better suited for applications in which preserving dynamic range is important.

In one embodiment, each of the vector modulators may include two mixers, the radio frequency (RF) input of one of which may be fed with the signal at the RF input of the vector modulator and the other of which may be fed with the input RF signal phase-shifted by 90 degrees. The two respective intermediate frequency (IF) inputs of the two mixers may then be fed with two respective analog voltages corresponding to the in-phase and quadrature components of one of the tap weights 320a-h, so that the two analog voltages represent the complex tap weight. Each vector modulator may for example be an HMC631LP3 vector modulator available from Analog Devices (www.analog-.com). As used herein, the terms radio frequency and RF refer to any frequency suitable for being transmitted for received with an antenna element and an electronic circuit, and include without limitation microwave and millimeter wave frequencies, for example.

Figure 5:
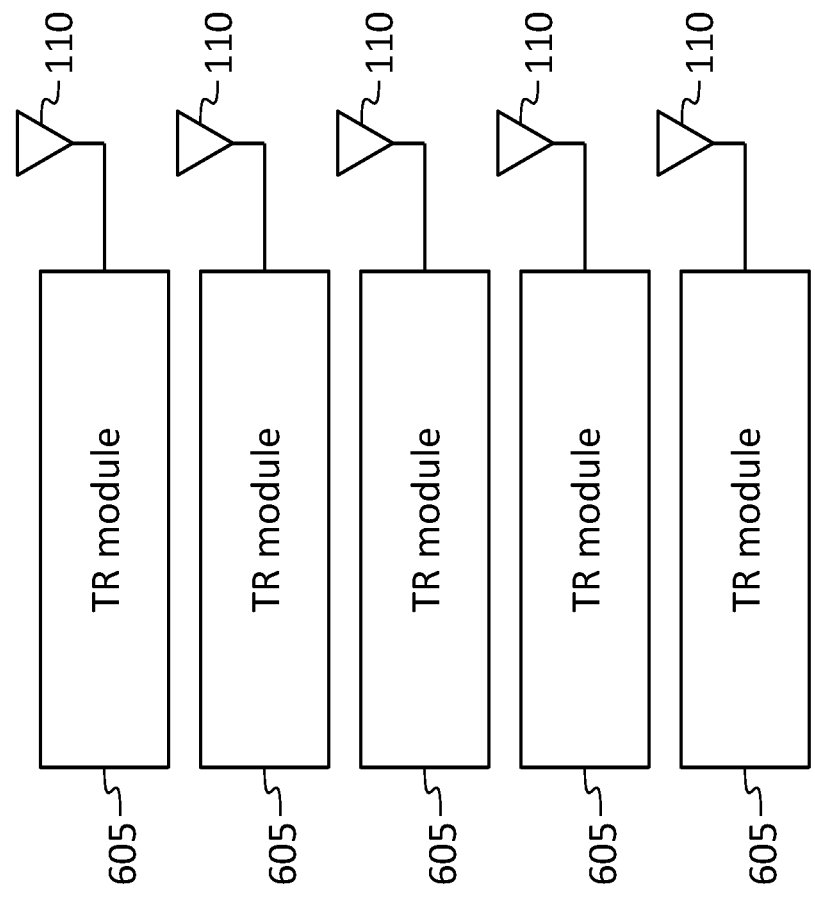
FIG. 5 is a block diagram of a linear array, according to an embodiment of the present invention.

Referring to FIG. 5, in some embodiments a plurality of antenna elements 110 may be connected to a plurality of transmit-receive (TR) modules 605 (each including a circulator connected to the corresponding antenna element as shown in FIG. 1 in addition to analog cancellation circuitry) to form, for example, a five-element linear array. In such an array, embodiments of the present invention may be employed to partially cancel parasitic leakage and parasitic cross-coupling, as discussed in further detail above.

The term "processing circuit" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

It will be understood that when an element is referred to as being "connected to", or "coupled to" another element, it may be directly connected to or coupled to the other element, or one or more intervening elements may be present. In contrast, when an element is referred to as being "directly connected to" or "directly coupled to" another element or layer, there are no intervening elements present.

Although limited embodiments of a system and method for microwave analog cancellation for in-aperture simultaneous transmit and receive have been specifically described and illustrated herein, many modifications and variations will be apparent to those skilled in the art. Accordingly, it is to be understood that the system and method for microwave analog cancellation for in-aperture simultaneous transmit and receive employed according to principles of this inven-

What is claimed is:

1. A transmit-receive phased array system for simultaneously transmitting and receiving, comprising:
a transmit input for receiving a signal to be transmitted;
a transmit output, operatively coupled to the transmit input, for producing a signal for an antenna element;
a receive input, for receiving a signal from the antenna element;
a receive output, for producing an analog corrected receive signal, the receive output operatively coupled to the receive input through a receive signal path;
an adjustable filter having:
an input operatively coupled to the transmit input, and
an output operatively coupled to the receive signal path;
a digitizer operatively coupled to, and configured to digitize signals from:
the receive output,
the input of the filter,
the output of the filter, and
the receive signal path,
to form corresponding digitized signals; and
a processing circuit, configured to:
control the adjustable filter so as to partially cancel parasitic leakage from the transmit input to the receive output,
wherein:
the adjustable filter is an analog finite impulse response filter, and
the analog finite impulse response filter is implemented as a tapped delay line,
wherein the tapped delay line comprises:
a plurality of power dividers, each having:
an input;
a first output; and
a second output;
a plurality of delay elements, each connected to a respective power divider of the plurality of power dividers; and
a plurality of multipliers for respective tap weights, each connected to a respective power divider of the plurality of power dividers,
a second delay element of the plurality of delay elements providing a delay twice as great as a delay provided by a first delay element of the plurality of delay elements, and
the second delay element providing a delay twice as great as a delay provided by a third delay element of the plurality of delay elements.

2. The system of claim 1, wherein the processing circuit is further configured to:
digitally filter the digitized signal from the output of the adjustable filter to form a digital parasitic leakage correction signal; and
subtract the digital parasitic leakage correction signal from the digital receive output signal.

3. The system of claim 1, wherein
the input of a second power divider of the plurality of power dividers is connected to the first output of a first power divider of the plurality of power dividers through a first attenuator,
the first output of the second power divider is connected to a multiplier for a first tap weight, of the plurality of multipliers for respective tap weights, through a second attenuator, and
the first output of a third power divider is connected to a multiplier for a second tap weight, of the plurality of multipliers for respective tap weights, through a third attenuator.

4. The system of claim 3, wherein each of:
the multiplier for the first tap weight; and
the multiplier for the second tap weight;
is a vector modulator configured to receive two analog voltages representing the respective tap weight.

5. The system of claim 4, further comprising a digital to analog converter connected to the processing circuit and to an analog input of each of the vector modulators.

6. The system of claim 1, further comprising:
a first directional coupler having:
an input port connected to the transmit input,
a coupled port, and
a through port, and
a second directional coupler having:
an input port connected to the coupled port of the first directional coupler,
a coupled port, and
a through port,
wherein the input of the adjustable filter is connected to the through port of the second directional coupler, and the input of the adjustable filter is operatively coupled to the transmit input through the first directional coupler and through the second directional coupler.

7. The system of claim 6, further comprising
a third directional coupler having:
an input port connected to the output of the filter,
a coupled port, and
a through port,
the coupled port being connected to the digitizer, and configured to provide, to the digitizer, the signal from the output of the filter.

8. The system of claim 1, wherein:
the adjustable filter comprises a plurality of control inputs for setting a corresponding plurality of adjustable parameters, and
the processing circuit is configured to calculate a plurality of parameter values and provide a plurality of corresponding signals to the control inputs.

9. The system of claim 8, wherein the processing circuit is configured to calculate the plurality of parameter values using a least mean squares method.

10. The system of claim 8, wherein the processing circuit is configured to calculate the plurality of parameter values using a recursive least squares filter.

11. A transmit-receive array, comprising a plurality of transmit-receive modules, each of the transmit-receive modules comprising:
a transmit input for receiving a signal to be transmitted;
a transmit output, operatively coupled to the transmit input, for producing a signal for an antenna element;
a receive input, for receiving a signal from the antenna element;
a receive output, for producing an analog corrected receive signal, the receive output operatively coupled to the receive input through a receive signal path;
an adjustable analog filter having:
an input operatively coupled to the transmit input, and
an output operatively coupled to the receive signal path;

a digitizer operatively coupled to, and configured to digitize signals from:
  the receive output,
  the input of the filter,
  the output of the filter, and
  the receive signal path,
to form corresponding digitized signals; and
a processing circuit, configured to:
  control the adjustable filter so as to partially cancel parasitic leakage from the transmit input to the receive output,
wherein:
  the adjustable filter is an analog finite impulse response filter, and
  the analog finite impulse response filter is implemented as a tapped delay line,
wherein the tapped delay line comprises:
  a plurality of power dividers, each having:
    an input;
    a first output; and
    a second output;
  a plurality of delay elements, each connected to a respective power divider of the plurality of power dividers; and
  a plurality of multipliers for respective tap weights, each connected to a respective power divider of the plurality of power dividers,
  a second delay element of the plurality of delay elements providing a delay twice as great as a delay provided by a first delay element of the plurality of delay elements, and
  the second delay element providing a delay twice as great as a delay provided by a third delay element of the plurality of delay elements.

12. The array of claim 11, wherein the processing circuit of each of the transmit-receive modules is further configured to:
  digitally filter the digitized signal from the output of the adjustable filter of the transmit-receive module to form a digital parasitic leakage correction signal; and
  subtract the digital parasitic leakage correction signal from the digital receive output signal of the transmit-receive module.

* * * * *